Patented Dec. 31, 1935

2,025,996

UNITED STATES PATENT OFFICE 2,025,996

LIGHT-SENSITIVE ORGANIC CHROMIC SALT COLLOID LAYER AND PROCESS OF PREPARING SAME

Gaston Maillet, Saint Ouen, France

No Drawing. Application March 16, 1934, Serial No. 715,997. In Belgium March 25, 1933

19 Claims. (Cl. 95—7)

In photomechanical processes of producing pictures or copies, for instance photogravure, off-set printing, heliogravure, phototypy and the like, use is generally made, for producing copies, of certain colloids, such as glue, gelatin, albumin, etc., which are sensitized by means of alkaline, neutral, or acid bichromates or chromates. When light rays are caused to act on colloidal layers or coatings of this kind, they produce a modification of the properties of these layers or coatings, and especially of their solubility in water. This modification makes it possible to obtain a positive or negative image of the print to be reproduced.

The object of the present invention is to obtain a sensitized colloid which does not require as long a time of exposure to light as the sensitized colloids that are used at the present time and therefore avoids the drawbacks that result from a prolonged exposure to light such as was necessary up to the present time.

The present invention consists essentially in using, as a sensitizing agent, an organic chromic salt, especially chromate or bichromate of pyridine, obtained by the direct action of chromic acid on the corresponding organic base (pyridine). The organic salt thus obtained may be separated or crystallized, or added in the dissolved state to the colloids.

According to the present invention, I admix with colloids such as glue, gelatin, albumin, or other matters generally utilized in photomechanical processes and the nature of which depends on the specific process that is to be employed, organic chromates obtained by the direct action of chromic acid on the corresponding organic base. For instance, in the particular case in which pyridine chromate or pyridine bichromate is to be used, I cause chromic acid to act directly on pyridine. Instead of pyridine I may also utilize carbamide or urea, piperidine, quinoxaline, quinoline, etc.

The bases, that are utilized, resist the oxidizing action of chromic acid, and the admixture of the product of the reaction with the colloid that is utilized gives a composition which is preserved for a sufficiently long time to permit of performing all the photomechanical treatments that may be necessary.

The organic chromic salts that are obtained constitute well defined compounds, which are primarialy stable salts, capable of being separated or even crystallized, and which, in this form, can be sold on the market. These salts are added in the dissolved state to the colloids. It is also possible to mix chromic acid with the base, or bases, that is, or are, utilized, either before or after their admixture with the colloids that are to be sensitized.

When, for instance, I make use of chromic anhydride and pyridine, I introduce into a solution of chromic acid (one part of anhydride in about the same weight of distilled water) an equimolecular amount of pyridine. During the reaction, the temperature is maintained by cooling below 50° C. The product that is obtained can be readily separated by crystallization or by evaporation. Concerning the quantity to be added to the colloids to be sensitized, one may choose about the same proportions as those applied up to now for the ordinary alkaline chromate or bichromate. Anyway, the viscosity of the colloid after the treatment must be such that said colloid can be readily spread on the support. Besides, the concentration of the salts depends on the nature of the colloid that is treated.

The mass thus obtained can be applied or spread onto a support, which may be metallic (zinc, copper, aluminium, etc.) or consist of any other suitable matter. In the case of heliogravure, paper is sensitized by dipping it in the sensitizing solution exactly as when ordinary alkaline bichromates are made use of.

The sensitized pieces that are thus obtained are then ready to be utilized for producing copies, photographic line cuts, either of the half tone or of any other type, through the ordinary treatment with albumin, carbon, or other matters generally used for photomechanical processes.

The process according to the present invention has the remarkable advantage of making it possible to obtain a considerable reduction of the time necessary for rendering the sensitized colloid insoluble by exposure to light. This reduction may in some cases be of the order of 100 and even 200%.

By reducing the required time of exposure, I avoid gelling of the surfaces of the layer of colloid, which are protected by the black portions of the cut, through an effect of simultaneous oxidation and polymerization, resulting from the production of free chromic acid. In the usual processes making use of alkaline bichromates or chromates, the action of light, when lasting for too long a time, may cause this gelling to take place even for these protected surfaces, which results in the formation of a fog, which has a very disturbing action on the subsequent treatments.

While I have described preferred examples of my invention, it should be well understood that I do not wish to be limited thereto as there might be changes therein without departing from the principle of my invention as comprehended within the scope of the appended claims.

What I claim is:

1. A process of sensitizing a colloid for use in photographic processes, which comprises adding a simple chromic salt of pyridine to this colloid.

2. A process of sensitizing a colloid for use in photographic processes, which comprises adding pyridine chromate to this colloid.

3. A process of sensitizing a colloid for use in photographic processes, which comprises adding pyridine bichromate to this colloid.

4. As a new product, a sensitized colloid for use in photographic processes in which the sensitizing agent consists of pyridine chromate.

5. As a new product, a sensitized colloid for use in photographic processes in which the sensitizing agent consists of pyridine bichromate.

6. As a new product for use in photographic processes, a support, and a coating of a colloid mixed with pyridine chromate on said support.

7. As a new product for use in photographic processes, a support, and a coating of a colloid mixed with pyridine bichromate on said support.

8. A photographic plate comprising a support covered with a coating of a colloid mixed with a chromate salt consisting of a chromate radical and an organic base of the pyridine group.

9. A photographic plate comprising a support covered with a coating of a colloid mixed with quinoline chromate.

10. A photographic plate comprising a support covered with a coating of a colloid mixed with quinoline bichromate.

11. A process of sensitizing a photographic colloid, comprising effecting a direct reaction between chromic acid and a heterocyclic nitrogen-containing organic base, cooling the reacting mass to maintain its temperature below 50° C., and mixing the reaction product with said colloid.

12. A process of sensitizing a photographic colloid, comprising effecting a direct reaction between substantially equal parts of chromic acid and a heterocyclic nitrogen-containing organic base, cooling the reacting mass to maintain its temperature below 50° C., and mixing the reaction product with said colloid.

13. A process of sensitizing a photographic colloid, comprising effecting a direct reaction between an organic base of the pyridine group and a solution consisting of substantially equal parts of chromic anhydride and water, cooling the reacting mass to maintain its temperature below 50° C., and mixing the reaction product with said colloid.

14. A process of sensitizing a photographic colloid, comprising effecting a direct reaction between pyridine and a solution consisting of substantially equal parts of chromic anhydride and water, cooling the reacting mass to maintain its temperature below 50° C., and mixing the reaction product with said colloid.

15. A process of sensitizing a photographic colloid, comprising effecting a direct reaction between quinoline and a solution consisting of substantially equal parts of chromic anhydride and water, cooling the reacting mass to maintain its temperature below 50° C., and mixing the reaction product with said colloid.

16. A process of sensitizing a photographic colloid, comprising effecting a direct reaction between chromic acid and an organic base of the pyridine group, cooling the reacting mass to maintain its temperature below 50° C., and mixing the reaction product with said colloid.

17. A process of sensitizing a photographic colloid, comprising effecting a direct reaction between chromic acid and pyridine, cooling the reacting mass to maintain its temperature below 50° C., and mixing the reaction product with said colloid.

18. A process of sensitizing a photographic colloid, comprising effecting a direct reaction between chromic acid and quinoline, cooling the reacting mass to maintain its temperature below 50° C., and mixing the reaction product with said colloid.

19. A process of sensitizing a photographic colloid, comprising effecting a direct reaction between chromic acid and an organic base selected from the group consisting of pyridine, pyperidine, quinoxaline and quinoline, cooling the reacting mass to maintain its temperature below 50° C., and mixing the reaction product with said colloid.

GASTON MAILLET.